United States Patent [19]

Bosen

[11] Patent Number: 4,457,852
[45] Date of Patent: Jul. 3, 1984

[54] ANTI-GEL CHARACTERISTICS OF SILICATE-CONTAINING ANTIFREEZE COMPOSITIONS

[75] Inventor: Sidney F. Bosen, Joliet, Ill.

[73] Assignee: Northern Petrochemical Company, Omaha, Nebr.

[21] Appl. No.: 513,765

[22] Filed: Jul. 14, 1983

[51] Int. Cl.$^3$ .............................................. C09K 5/00
[52] U.S. Cl. ...................................... 252/78.3; 252/75
[58] Field of Search ................................ 252/75, 78.3

[56] References Cited

U.S. PATENT DOCUMENTS

| | | | |
|---|---|---|---|
| 3,198,820 | 8/1965 | Pines et al. | 260/448.2 |
| 3,248,329 | 4/1966 | Pines et al. | 252/78.3 |
| 3,312,622 | 4/1967 | Pines et al. | 252/75 |
| 3,337,496 | 8/1967 | Pines et al. | 260/46.5 |
| 3,341,469 | 9/1967 | Pines et al. | 252/75 |
| 4,333,843 | 6/1982 | Wing et al. | 252/75 |
| 4,367,154 | 1/1983 | Jernigan | 252/78.3 |

OTHER PUBLICATIONS

U.K. Patent Application, 2,018,266, Plueddemann, 10-1979.

Primary Examiner—John E. Kittle
Assistant Examiner—Robert A. Wax
Attorney, Agent, or Firm—Donald F. Haas

[57] ABSTRACT

A method and a composition for improving the anti-gel characteristics of antifreeze compositions which contain silicate corrosion inhibitors are disclosed. The anti-gel characteristics are improved through the use of a mercaptosilane of the formula:

$$(SH-R_1)_n-Si(R_2)_{4-n}$$

wherein n is 1, 2, or 3, $R_1$ is branched or straight chain alkyl with 1 to 8 carbon atoms or aromatic with 6 to 10 carbon atoms, and $R_2$ is a reactive group which will cause the mercaptosilane to form a silanol when hydrolyzed.

8 Claims, No Drawings

ANTI-GEL CHARACTERISTICS OF SILICATE-CONTAINING ANTIFREEZE COMPOSITIONS

BACKGROUND OF THE INVENTION

This application relates to an improved corrosion-inhibited alcohol antifreeze composition for use in the cooling systems of internal combustion engines. The invention also relates to a method for improving the anti-gel characteristics of antifreeze compositions which contain silicate corrosion inhibitors.

Antifreeze compositions containing alcohols, especially ethylene glycol, are commonly mixed with the cooling water in the cooling systems of internal combustion engines in order to depress the freezing point of the water and to increase the boiling point of the water. The alcohols gradually decompose in the cooling systems to produce acidic products which lower the pH of the antifreeze. It has been found that the metallic surfaces of the internal combustion engines become seriously corroded as the pH of the coolant decreases.

It has been known for many years that corrosion inhibitors must be added to the antifreeze compositions in order to retard the corrosion of the metal surfaces of the engines. Many such corrosion inhibitors are known. Alkali metal silicates are commonly used to reduce corrosion of aluminum heat rejecting surfaces. Antifreeze compositions containing such silicates generally have poor shelf life because of the tendency of the silicates to gel and/or form precipitates during storage.

It is an object of this invention to provide an improved silicate-containing antifreeze composition which has a longer shelf life because of improved anti-gel characteristics.

Certain silane compounds have been used in antifreeze compositions to improve the anti-gel characteristics of those compositions. U.S. Pat. Nos. 3,198,820 and 3,312,622 disclose the use of organic acid silane compounds for this purpose. U.S. Pat. No. 3,248,329 discloses the use of aminosilane compounds for this purpose. U.S. Pat. Nos. 3,337,496 and 3,341,469 disclose the use of hydroxy alkyl silanes for this purpose. U.S. Pat. No. 4,333,843 discloses glycol compositions containing a hydrolyzate of an organo phosphorus-silicon compound. Finally, United Kingdom patent application No. 2018266 discloses the use of phosphonate silanes for this purpose.

Prior to the present invention, it was felt that sulfur containing compounds should not be used in antifreeze compositions because of the highly corrosive nature of such compositions. Mercapto-containing compositions, of course, were included in this general prohibition. Unexpectedly, I have found that mercaptosilanes can be used in antifreeze compositions to improve the anti-gel characteristics thereof without increasing the corrosive nature of such antifreeze compositions.

SUMMARY OF THE INVENTION

The objects of the present invention are accomplished by adding at least about 0.002% and less than about 0.05% by weight of a mercaptosilane to an alcohol-based antifreeze composition which contains a silicate corrosion inhibitor. The mercaptosilane has the following formula:

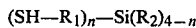

wherein n is 1, 2, or 3, $R_1$ is branched or straight chain alkyl with 1 to 8 carbon atoms or aromatic with 6 to 10 carbon atoms, and $R_2$ is a reactive group which will cause the mercaptosilane to form a silanol when hydrolyzed.

Generally, $R_2$ can be $-OR_3$, $-OH$, $-Cl$, or

wherein $R_3$ is branched or straight chain alkyl with 1 to 8 carbon atoms or a phenyl or substituted phenyl group. In a preferred embodiment of the invention, $R_1$ is methyl, ethyl, or propyl and $R_2$ is $-OR_3$ wherein $R_3$ is methyl or ethyl. In the most highly preferred embodiment of this invention, $R_1$ is n-propyl, $R_2$ is $-OR_3$, $R_3$ is methyl, and n is 1.

DETAILED DESCRIPTION OF THE INVENTION

Generally, the present invention relates to improved antifreeze compositions for use in the cooling systems of internal combustion engines. Such compositions generally comprise, as the base material, an alcohol selected from the group consisting of methanol, ethanol, propanol, ethylene gylcol, diethylene glycol, triethylene glycol, propylene glycol, and glycerol. The preferred alcohol is ethylene glycol.

It is advisable to add corrosion inhibitors to the antifreeze compositions to reduce the amount of corrosion on the metal surfaces of the internal combustion engines. Alkali metal silicates are commonly used to reduce the corrosion of aluminum heat rejecting surfaces. Such silicates are water soluble and composed of cation oxide units and silicon dioxide units. These materials are discussed in more detail in U.S. Pat. No. 3,248,329, patented Apr. 26, 1966. Illustrative of such silicates are alkali metal orthosilicates, alkali metal metasilicates, alkali metal tetrasilicates, alkali metal disilicates, and tetra (organo) ammoniumsilicates. Specific examples of these silicates are sodium metasilicate pentahydrate, potassium metasilicate, sodium orthosilicate, potassium disilicate, lithium orthosilicate, lithium metasilicate, lithium disilicate, rubidium disilicate, rubidium tetrasilicate, mixed silicates, tetra methyl ammoniumsilicate, tetra ethyl ammoniumsilicate, phenyltrimethyl ammoniumsilicate, benzyltrimethyl ammoniumsilicate, guanidine silicate, and tetra hydroxyethyl ammoniumsilicate.

The mercaptosilanes which are useful in improving the anti-gel characteristics of antifreeze compositions containing silicate corrosion inhibitors are those which are set out in the formula given above. It is best that $R_1$ be a branched or straight chain alkyl group of not more than 8 carbon atoms or an aromatic group of not more than 10 carbon atoms because there may be solubility problems if $R_1$ is a larger group. As stated above, $R_2$ must be a reactive group which will cause the mercaptosilane to form a silanol when hydrolyzed. In other words, the $R_2$ group must hydrolyze in the presence of water to form $(SH-R_1)_n-Si(OH)_{4-n}$ and $R_2H$ groups which are soluble.

Illustrative of the group of mercaptosilanes which are useful in the present invention are those in which $R_2$ is $-OR_3$, $-OH$, $-Cl$,

—NCHNCHCH,
|_____| wherein $R_3$ is branched or straight chain alkyl with 1 to 8 carbon atoms or a phenyl or substituted phenyl group. It is preferred that $R_1$ be methyl, ethyl, or propyl and $R_2$ be —$OR_3$ wherein $R_3$ is methyl or ethyl because the solubility of such compounds is better in ethylene glycol and the final antifreeze composition than compounds which contain larger groups. The most preferred mercaptosilane for use in the present invention is 3-mercaptopropyltrimethoxysilane ($R_1$ is propyl, $R_2$ is —$OR_3$, $R_3$ is methyl, and n is 1). This compound is preferred merely because it is commercially available.

As stated above, at least about 0.002% by weight of a mercaptosilane should be added to the antifreeze composition to obtain the advantages of the invention. If less than this amount is used, the anti-gelation action of the composition is relatively ineffective. I have found that 0.006% of the mercaptosilane is more than sufficient to produce anti-gelation action which will protect the antifreeze composition for 30 days in an oven at 150° F. which industry practice agrees is equivalent to 30 months on the shelf at ambient conditions. At the present day cost of mercaptosilanes, it would be uneconomical to use more than about 0.01% of the mercaptosilane. The anti-gelation action drops off significantly when the concentration is increased to 0.05%. The practical upper limit for use of these compounds would be the concentration at which the antifreeze solution becomes corrosive. Depending upon the particular mercaptosilane used, this may or may not occur.

The improvement in the anti-gel characteristics of the antifreeze compositions of the present invention is achieved because of the chemical reaction between the various silanol and silicate components of the composition. When the mercaptosilane is added to a silicate-containing antifreeze composition, it is hydrolyzed by the water present to form the corresponding silanol. The silanol reacts with the silicate in the composition to form a reaction product which is much more stable with respect to gel and precipitate formations than the original silicate. Thus, the silicate remains in solution in the antifreeze composition. It is theorized that the silanol formed polymerizes in some way, but it is unclear whether the silanol polymerizes with itself or whether it copolymerizes with the silicate. The important thing is that the silicate stays in solution and the part of the silicate which exhibits corrosion inhibition activity retains this activity.

The following example is meant only to illustrate the invention and not to limit it in any way.

EXAMPLE

The table below sets forth the results of the following comparative experiments. In each case, the base antifreeze composition was formulated as follows and the mercaptosilane was added thereto. 8.2 grams of a 45% aqueous potassium hydroxide solution is added to 475.1 grams of ethylene glycol with stirring. Then 1.3 grams of sodium tetraborate pentahydrate are added. After the borate is dissolved, 3.7 grams of 75% phosphoric acid and 1.2 grams of 50% sodium tolyltriazole are added. A solution is made of 1.3 grams of sodium nitrate dissolved in 2 grams of water and added to the glycol. 0.9 grams of sodium metasilicate pentahydrate is dissolved in 6 grams of water and added to the glycol solution.

The solutions were all placed in an oven at 150° F. The following table indicates the number of days which passed before gelation occurred for each composition.

TABLE

| Silicate Added (Weight Percent) | Days at 150° F. |
| --- | --- |
| 0 | 11 + or − 3 |
| 0.0007 | 11 + or − 3 |
| 0.0018 | 13 |
| 0.0024 | 16 |
| 0.0036 | 25 |
| 0.006 | >30 |
| 0.012 | >30 |
| 0.02 | >30 |
| 0.025 | >30 |
| 0.03 | >30 |
| 0.035 | >30 |
| 0.04 | >30 |
| 0.045 | >30 |
| 0.05 | 9 |
| 0.10 | 1 |
| 0.50 | 1 |

It can be seen from the results shown in the above table that the antifreeze compositions of the present invention do provide a significant increase in the gelation time for the antifreeze composition. It also can be seen that the anti-gelation activity increases as the concentration is increased above 0.002 weight percent and drops off quite dramatically somewhere between the concentration of 0.045% and 0.05%. In addition to the anti-gelation activity, the above antifreeze compositions within the scope of the present invention satisfy all of the standard corrosion tests.

I claim:

1. An improved corrosion-inhibited alcohol antifreeze composition for use in the cooling systems of internal combustion engines which comprises:
   (a) An alcohol selected from the group consisting of methanol, ethanol, propanol, ethylene glycol, diethylene glycol, triethylene glycol, propylene glycol, and glycerol,
   (b) A silicate corrosion inhibitor, and
   (c) At least about 0.002% and less than about 0.05% by weight of a mercaptosilane of the formula:

$$(SH—R_1)_n—Si(R_2)_{4-n}$$

wherein n is 1, 2, or 3, $R_1$ is branched or straight chain alkyl with 1 to 8 carbon atoms or aromatic with 6 to 10 carbon atoms, and $R_2$ is a reactive group which will cause the mercaptosilane to form a silanol when hydrolyzed.

2. The composition of claim 1 wherein $R_2$ is —$OR_3$, —OH, —Cl, or

—NCHNCHCH,
|_____| wherein $R_3$ is branched or straight chain alkyl with 1 to 8 carbon atoms or a phenyl or substituted phenyl group.

3. The composition of claim 2 wherein $R_1$ is methyl, ethyl, or propyl and $R_2$ is —$OR_3$ wherein $R_3$ is methyl or ethyl.

4. The composition of claim 3 wherein $R_1$ is propyl, $R_3$ is methyl, and n is 1.

5. A method of improving the anti-gel characteristics of silicate-containing alcohol-based compositions which comprises adding to said compositions at least about 0.002% and less than about 0.05% by weight of a mercaptosilane of the formula $$(SH-R_1)_n-Si(R_2)_{4-n}$$

wherein n is 1, 2, or 3, $R_1$ is branched or straight chain alkyl with 1 to 8 carbon atoms or aromatic with 6 to 10 carbon atoms, and $R_2$ is a reactive group which will cause the mercaptosilane to from a silanol when hydrolyzed.

6. The method of claim 5 wherein $R_2$ is $-OR_3$, $-OH$, $-Cl$, or

wherein $R_3$ is branched or straight chain alkyl with 1 to 8 carbon atoms or a phenyl or substituted phenyl group.

7. The method of claim 6 wherein $R_1$ is methyl, ethyl, or propyl and $R_2$ is $-OR_3$ wherein $R_3$ is methyl or ethyl.

8. The method of claim 7 wherein $R_1$ is propyl, $R_3$ is methyl, and n is 1.

* * * * *